United States Patent [19]
Moore et al.

[11] Patent Number: 5,954,385
[45] Date of Patent: Sep. 21, 1999

[54] HOLDING DEVICE FOR WINDSHIELD ASSEMBLY

[75] Inventors: Howard L. Moore, Wake Forest, N.C.; John R. Holzaepfel, Peachtree, Ga.

[73] Assignee: U.S. Supply Company, Inc., Raleigh, N.C.

[21] Appl. No.: 09/131,724

[22] Filed: Aug. 10, 1998

Related U.S. Application Data

[62] Division of application No. 08/568,185, Dec. 6, 1995, Pat. No. 5,791,720.

[51] Int. Cl.⁶ .......................................................... B60J 1/00
[52] U.S. Cl. ..................... 296/96.2; 296/84.1; 296/96.21; 24/336; 24/557
[58] Field of Search .......................... 296/77.1, 79, 84.1, 296/96.2, 96.21, 96.22; 24/336, 545, 557

[56] References Cited

U.S. PATENT DOCUMENTS

| | | | |
|---|---|---|---|
| 3,965,540 | 6/1976 | Moore | 24/336 X |
| 4,343,503 | 8/1982 | Samuelson et al. | 296/96.21 |
| 4,488,750 | 12/1984 | Gerber | 296/77.1 |
| 4,773,695 | 9/1988 | Jones et al. | 296/77.1 |
| 5,110,174 | 5/1992 | Andree | 296/77.1 |
| 5,192,109 | 3/1993 | Roberts | 296/84.1 |
| 5,195,797 | 3/1993 | Hobbs | 296/77.1 |
| 5,385,379 | 1/1995 | Heavner | 296/84.1 |
| 5,385,380 | 1/1995 | Heavner | 296/84.1 |
| 5,463,189 | 10/1995 | Deneke et al. | 24/336 X |
| 5,791,720 | 8/1998 | Moore et al. | 296/96.2 |

OTHER PUBLICATIONS

"Golf Car News Magazine", (Jul./Aug. 1992), pp. 4, 7, 10, 17, 21, inside back cover and outside back cover.
Advertisement "Slim Line" Enclosures made by Red Dot Enclosure (undated), 2 pp.
"Golf Car News Magazine", (Jan./Feb. 1994), 2 pp. Including outside back cover.
"Golf Car News Magazine", (Mar./Apr. 1995), pp. 4, 9, 10, 13, 23, 30, and outside back cover.
"Tops, Windshields and Accessories for All Golf Car Makes and Models", brochure of Blue Dot Tops/US Supply Co., 23 pp. (undated).

*Primary Examiner*—Stephen T. Gordon
*Attorney, Agent, or Firm*—Myers Bigel Sibley & Sajovec

[57] ABSTRACT

A holding device adapted to be secured along a side edge of a windshield panel to be releasably secured to a post of a recreational vehicle support frame is provided. The holding device being of a generally U-shaped configuration. This holding device comprises a base wall which defines a lateral direction and a first side wall extending outwardly from the base wall. The first side wall defines an outer end and has a slot formed therein which extends from the outer end inwardly a substantial portion of the distance to the base wall. The slot is sized and configured to receive an edge portion of a windshield panel therein. The holding device further comprises an opposite side wall extending outwardly from the base wall so as to laterally oppose the first side wall and define a post receiving chamber therebetween. The holding device is preferably formed of a material having sufficient flexibility so as to permit the opposite side wall to be flexed laterally away from the first side wall and thereby permit a post to enter and be removed from the chamber in a generally lateral direction. The base wall, first side wall and opposite side wall are preferably integrally formed of an elastomeric material. The holding device can, according to the present invention, include an extension which extends laterally beyond the opposite side wall so as to facilitate manual flexing of the opposite side wall away from the first side wall.

9 Claims, 4 Drawing Sheets

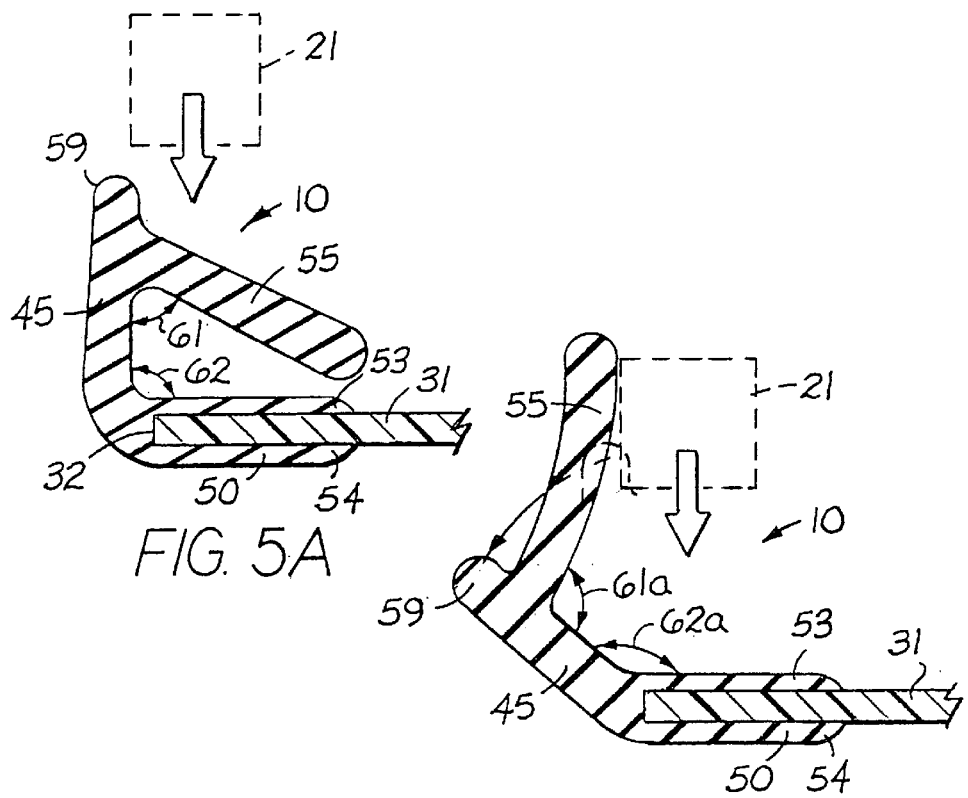
FIG. 5A
FIG. 5B
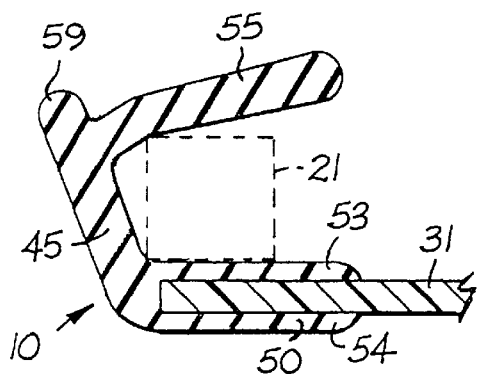
FIG. 5C
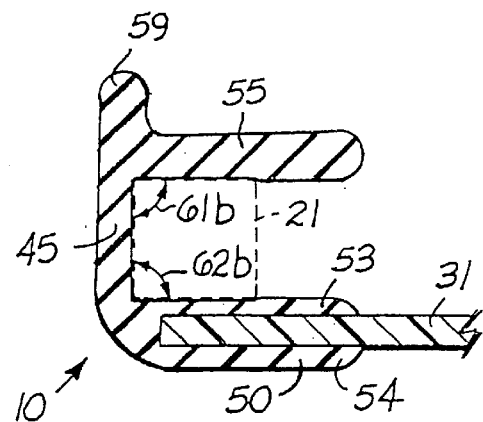
FIG. 5D

HOLDING DEVICE FOR WINDSHIELD ASSEMBLY

This application is a division of 08/568,185, issued Dec. 6, 1995, now U.S. Pat. No. 5,791,729.

FIELD OF THE INVENTION

The present invention relates generally to recreational vehicles such as golf cars or utility vehicles with releasably attached windshield assemblies, and more particularly to a holding device in a windshield assembly for releasably securing the windshield assembly to a recreational or utility vehicle.

BACKGROUND OF THE INVENTION

Recreational vehicles, including golf cars, are typically supplied with top coverings or canopies and windshield assemblies to protect occupants from foul weather, wind and sun. Most conventional recreational vehicles, such as golf cars, include a frame support system attached to the car body, consisting of front and rear vertical frame posts which support the top covering and windshield assembly. The windshield assembly is typically attached to the posts on the vehicle front and protects the occupants from wind and weather while moving.

Recreational vehicles, especially golf cars, have been equipped with windshield assemblies of various types including single and multi-panel windshields, as well as windshields which open, are detachable or are fixedly connected to the vehicle.

Golf cars with single-panel windshield assemblies are usually equipped with a windshield panel permanently affixed directly to the frame of the vehicle by fasteners such as screws or bolts. Such permanently attached windshields experience torque and other forces and stresses from direct contact with the frame which are transferred from the golf car frame to the windshield during use. Other permanently affixed windshields have used fasteners such as screws or bolts which also cause cracking and tearing. Some of these windshield assemblies require holes be drilled in the windshield panel, weakening the panel and contributing to tearing and cracking of the windshield. Further, these windshields create undesirable noises, such as rattles and squeaks during use.

Golf cars with windshield assemblies which open have been made in various forms. Many of these windshield assemblies consist of a panel movable between a closed or raised position and an open or lowered position. In the closed position, the windshield panel is connected to the frame support system blocking entry of wind or rain into the cab portion of the golf car. In the open position, the panel is lowered away from the golf car frame creating an opening. Some of these cars utilize multi-paneled windshield assemblies having an upper windshield panel and lower windshield panel. Typically, the lower panel has been permanently attached to the golf car frame support posts. The upper panel is the movable panel and is able to be moved from the closed position to the open position.

Some of these multi-panel windshields have been manufactured in two panels connected to a recreational or utility vehicle by various methods. One type of connection for multi-paneled windshield assemblies is by a pawl latch device. In this connection, a hole is drilled in the windshield and a clip is inserted into the hole in the windshield. The clip is turned and folded to hold the windshield in place on the frame. Such connections permit vibrational stresses, torques and other forces to be transferred to the windshield which is in direct contact with the vehicle frame, causing cracking or tearing of the windshield. This type of damage requires frequent and costly replacement of the windshield. Noises such as squeaking and rattling of the windshield during movement of the car are also significant problems in these previous designs.

Other multi-paneled and single panel windshield assemblies have utilized snap-on fasteners or clips to join the windshield assembly to the frame. One type of these snap-on clips is an elongated extruded PVC clip having a rigid, C-shaped gap. Examples of this connector are shown in U.S. Pat. No. 4,343,503 to Samuelson. These snap-on PVC-clips are utilized by snapping the clip over the edge of the windshield and the golf car frame together in the C-shaped channel to hold the windshield in place.

These snap-on fittings also hold the windshield in direct contact with the golf car frame system causing the windshield to tear and crack during movement of the car. These snap-on devices also easily fall off during use allowing the windshield to fall off of the car. Over time, the material of these PVC snap-on clips fails or cracks, lessening the gripping and holding ability of these clips. Further, squeaking, rattling and other noises are also experienced with these clips.

Other windshield assemblies have been made utilizing retainers which are permanently attached to the car frame. One type of windshield assembly uses a retainer screwed to the car frame which grips the windshield by a clip. An example of this is shown in U.S. Pat. No. 5,385,380 to Heavner. The car end user must drill a hole in the frame of the golf car to attach this retainer. Such retainers loosely hold the windshield, allowing the windshield to slip and fall out of the retainer during use or flop open during movement of the golf car. These retainers also allow the windshield to move within the retainer causing squeaking and other undesirable noises.

Other windshield assemblies with retainers attached to the frame have used PVC snap-on clips in combination with other retainers to permanently affix the windshield assembly to the car and releasably grasp the windshield. They experience similar problems as the types which screw to the car frame. One such system is recited by U.S. Pat. No. 5,385,379 to Heavner.

Additionally, many of these windshield assemblies require tools for attachment by the end user. For instance, some of these windshields require the end user to drill holes or attach fasteners to the car frame or windshield with screw drivers or wrenches.

There is therefore a need for recreational or utility vehicle having a windshield assembly utilizing a holding device that easily, releasably attaches to frame support posts of a recreational or utility vehicle while remaining secured to the windshield panel of a windshield assembly. There is a further need for a windshield assembly with a holding device that effectively secures the windshield assembly to the vehicle frame when the windshield assembly is in the raised or closed position while allowing the upper panel of the windshield assembly to release the frame in lowering the assembly to the open or lowered position. There is a further need for a windshield assembly for a vehicle having a holding device that secures the windshield panel within the holding device while requiring no tools for attachment and which eliminates undesirable noises.

Accordingly, it is an object of the present invention to provide a recreational vehicle, such as a golf car, having a windshield assembly utilizing a holding device which releasably secures a windshield to a recreational vehicle. It is a further object to provide a windshield assembly which can be releasably attached to a recreational vehicle frame such as a golf car frame utilizing an improved holding device. It is still further an object of the present invention to provide a holding device which releasably attaches a windshield to a recreational vehicle frame.

It is a further object of this invention to provide a holding device which reduces or eliminates forces or stresses transferred from the recreational vehicle frame to a windshield panel during use which cause tearing, cracking and breakage of recreational vehicle windshield assemblies.

It is a further object to provide a holding device for windshield assemblies which reduces or eliminates undesirable noises such as squeaking and rattling from windshield assemblies by providing cushioning between the windshield and the recreational vehicle frame.

It is a further object of this invention to provide a windshield assembly utilizing an improved holding device which can be easily releasably attached to a recreational vehicle without requiring any tools.

SUMMARY OF THE INVENTION

The above and other objects, features and advantages are achieved by the holding device of the present invention which releasably secures a windshield assembly to a recreational vehicle such as a golf car.

One embodiment according to the present invention comprises a holding device adapted to be secured along a side edge of a windshield panel so as to permit the windshield panel to be releasably secured to a post of a recreational vehicle frame support. The holding device releasably attaches to the recreational vehicle frame.

The holding device is of a generally U-shaped configuration. This holding device comprises a base wall which defines a lateral direction and a first side wall extending outwardly from the base wall. The first side wall defines an outer end and has a slot formed therein which extends from the outer end inwardly a substantial portion of the distance to the base wall. The slot is sized and configured to receive an edge portion of a windshield panel therein. The holding device further comprises an opposite side wall extending outwardly from the base wall so as to laterally oppose the first side wall and define a post receiving chamber therebetween. The holding device preferably formed of a material having sufficient flexibility so as to permit the opposite side wall to be flexed laterally away from the first side wall and thereby permit a post to enter and be removed from the chamber in a generally lateral direction. The holding device preferably comprises a base wall, first wall and opposite side wall integrally formed of an elastomeric material. The holding device can, according to the present invention, include an extension which extends laterally beyond the opposite side wall so as to facilitate manual flexing of the opposite side wall away from the first side wall.

Another embodiment of this invention comprises a holding device in combination with a windshield assembly for releasably securing a windshield to a recreational vehicle. More specifically, this embodiment comprises a windshield assembly for mounting on a wheeled recreational vehicle which comprises a vehicle frame mounted to supporting wheels and including a pair of spaced apart upright posts which define the front of the vehicle. The windshield assembly is mounted substantially between the pair of posts. The windshield assembly comprises a lower panel fixedly mounted to the posts so as to extend therebetween, and an upper panel pivotally mounted to the lower panel for pivotal movement between a raised position and a lowered position. The windshield assembly further comprises a pair of holding devices secured to respective side edge portions of the upper panel so as to releasably engage the posts when the upper panel is in the raised position.

The invention in a still further embodiment comprises a holding device and windshield assembly as described in combination with a recreational vehicle. This embodiment comprises a wheeled recreational vehicle such as a golf car comprising a vehicle frame mounted to supporting wheels and including a pair of spaced apart upright posts which define the front of the vehicle and a windshield assembly mounted substantially between the pair of posts as described above.

Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be made to the embodiments illustrated in greater detail in the accompanying drawings and described below. While the invention will be described in connection with preferred embodiments, it will be understood that it is not intended to limit the invention to those embodiments.

FIG. 3A is a perspective view of this embodiment of the holding device wherein adhesive has been applied to the holding device for securing the windshield panel in the slot of the holding device.

FIG. 3B is a perspective view of this embodiment of the holding device secured to the edge portions of the windshield panel according to the present invention.

FIG. 3C is a perspective view of this embodiment of the holding device secured to the edge portions of the windshield panel with a cutaway view of a recreational vehicle post releasably grasped by the holding device according to the invention.

FIGS. 5A–5D are a sequence of sectional views of one embodiment according to the present invention of the holding device secured to the edge portions of a windshield panel and releasably grasping a recreational vehicle support post.

FIG. 5A is a sectional view of one embodiment of the holding device according to the present invention with the holding device secured to a windshield panel within the slot of the holding device.

FIG. 5B is a sectional view of this embodiment of the holding device secured to a windshield panel and the holding device being flexed to open the post receiving chamber for receiving a recreational vehicle support post.

FIG. 5C is a sectional view of this embodiment of the holding device according to the present invention secured to a windshield panel and receiving the recreational vehicle support post in the post receiving chamber.

FIG. 5D shows a sectional view of this embodiment of the holding device according to this invention secured to a windshield panel and securing a recreational vehicle support post within the post receiving chamber.

DETAILED DESCRIPTION OF THE INVENTION

Figures 1, 2:
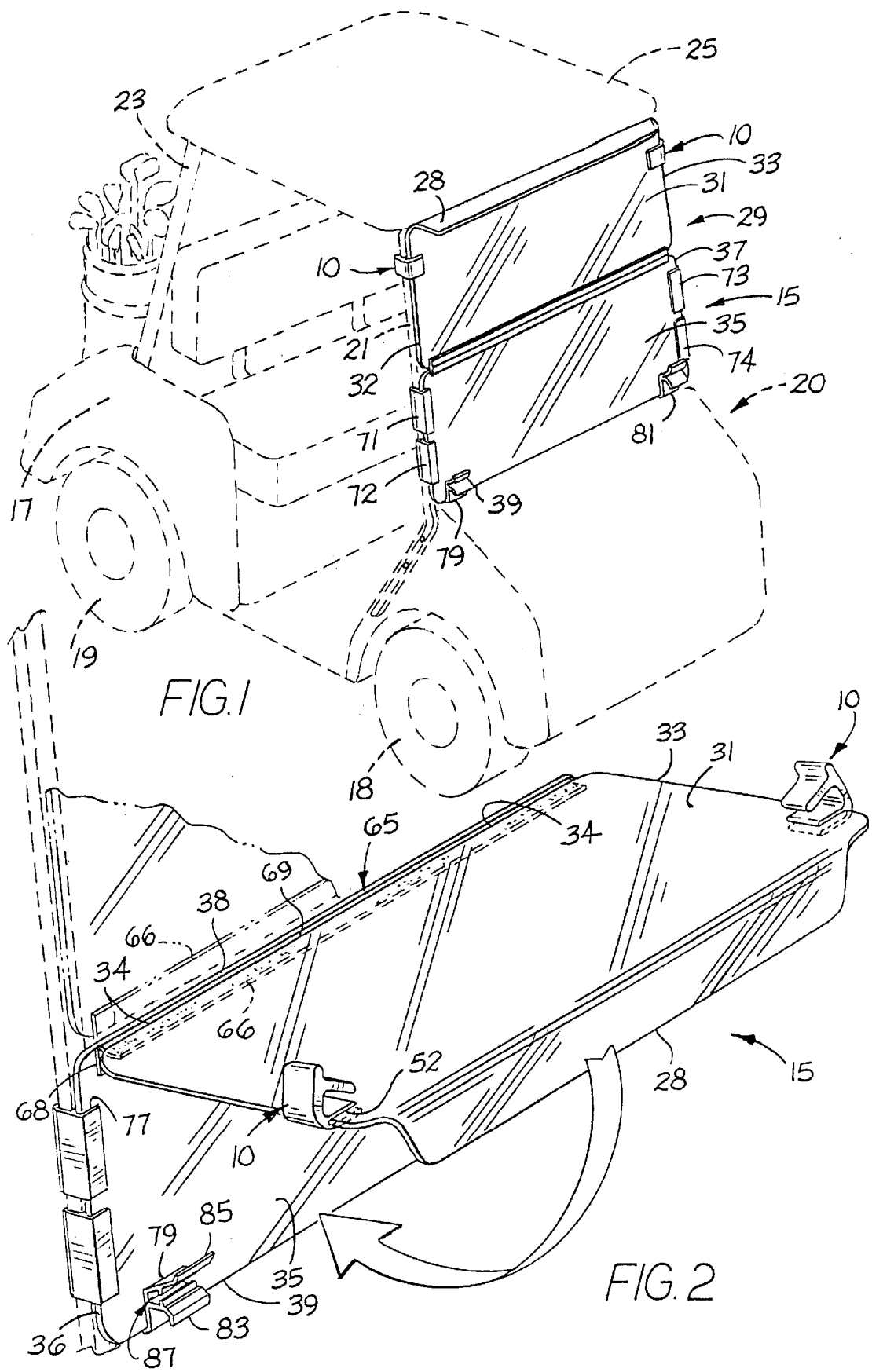
FIG. 1 is an environmental view of a recreational vehicle having a windshield assembly with a holding device according to the present invention.
FIG. 2 is a perspective view of a windshield assembly with a holding device according to the present invention showing the upper panel of the windshield assembly in transition from a raised position to a lowered position.

With further reference to the drawings, FIG. 1 shows a holding device 10 of a windshield assembly 15 of the present invention releasably attached to the frame 17 of a golf car 20 or other recreational vehicle. As used herein, "recreational vehicle" is defined to include recreational vehicles such as golf cars and utility vehicles such as a vehicle manufactured by Kawasaki sold under the name Mule. Generally the vehicle frame 17 is supported on front wheels 18 and rear wheels 19. The frame 17 includes a pair of spaced apart upright support posts 21. The upright support posts 21 define the front of recreational vehicle 20.

The recreational vehicle shown in FIG. 1 includes a pair of spaced upright posts 21 commonly secured in holes or on the sides of certain vehicle frames 17. Examples of this post frame configuration are found on vehicles such as some golf cars manufactured and sold under the name E-Z-GO®. Other recreational vehicles or golf cars 20, include a post configuration having generally u-shaped post frame. This u-shaped post frame includes a horizontal frame post attached between or integrally formed with a pair of spaced apart upright posts 21 for attachment of certain windshield assemblies. These u-shaped post frames are typically bolted on the side of the vehicle frame 17. Examples of such unshaped post frames are found on some golf cars manufactured by Club Car, Yamaha, and Melex.

As used herein, "spaced apart upright posts" refers to recreational vehicle post configurations including the unshaped post frame described, spaced apart separate posts attached to opposite sides of a recreational vehicle as described and any other recreational vehicle post configuration which includes at least two spaced upright posts attached in any manner to a recreational vehicle.

The recreational vehicle frame 17 can also comprise a pair of rear upright posts 23. The upright posts support the covering or canopy 25 of the golf car 20 if present.

Various types of windshield assemblies including both single panel or multi-panel windshields could be attached utilizing the holding device 10 according to this invention. As shown in FIGS. 1 and 2, the preferred embodiment of the windshield assembly 15, consists of a multi-paneled windshield 29 comprising an upper panel 31 and a lower panel 35 with the upper panel 31 being pivotally connected such that the upper panel 31 is movable between a raised or closed position and a lowered or open position. The closed position is shown in FIG. 1, with the upper panel connected to the front support post 21 by the holding device 10 such that the upper panel 31 is coplanar with the lower panel 35 and the side edge portions 32, 33 of the upper panel 31 are overlying respective front support posts 21. In the lowered position, the upper panel 31 is overlying the lower panel 35.

Figure 4:
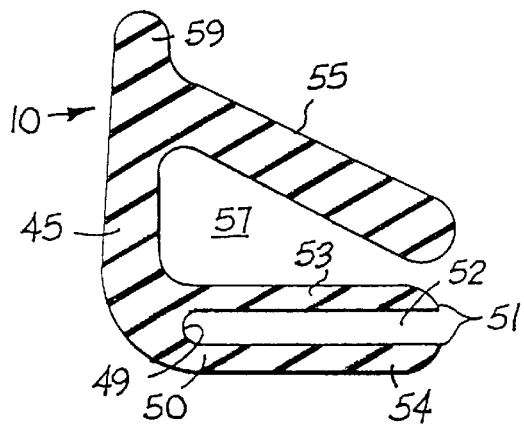
FIG. 4 is a sectional view of one embodiment taken along line 4—4 of FIG. 3A of the holding device according to the present invention.

In order to releasably attach the upper panel 31 of the windshield assembly 15 to the frame 17 of the recreational vehicle or golf car 20, a holding device 10 according to the present invention is provided in FIGS. 1 and 2. The holding device 10 of one embodiment according to the present invention is of a generally U-shaped configuration when viewed in a cross-sectional view as shown in FIG. 4. In the embodiment illustrated therein, the holding device 10 comprises a base wall 45 which defines a lateral direction. A first sidewall 50 extends outwardly from the base wall 45. The first sidewall 50 defines an outer end 51 containing a slot 52 formed within the first sidewall 50. The first sidewall 50 is preferably flexible.

Figure 3A:
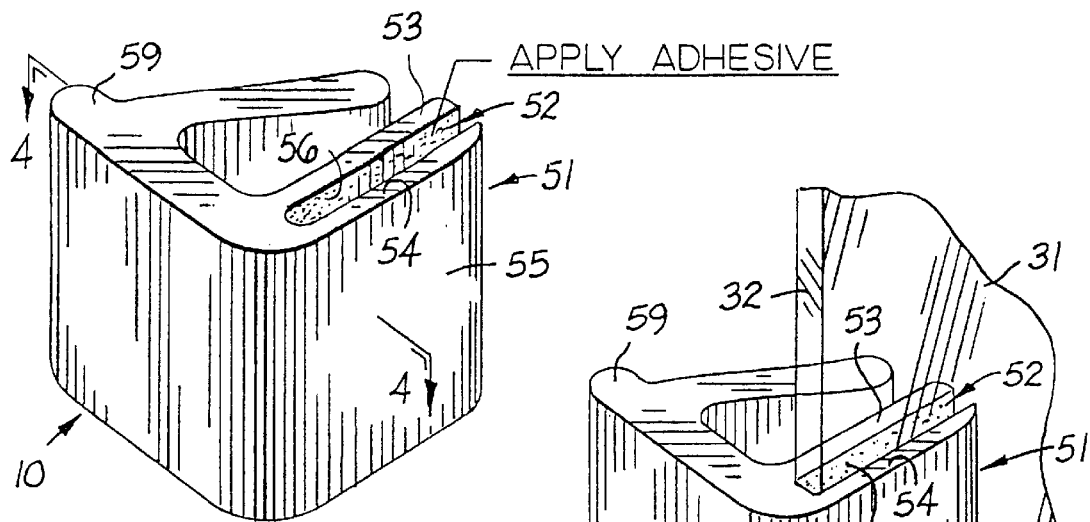
FIGS. 3A–3C are a sequence of perspective views of one embodiment according to the invention of the holding device secured to a windshield panel of a windshield assembly and releasably securing a vehicle frame support post.
Figure 3B:
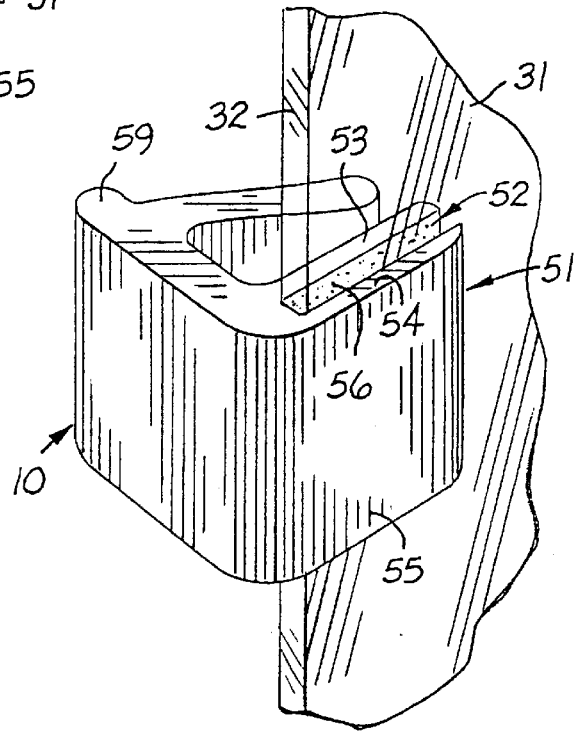

The slot 52 is formed between legs 53, 54 which extend and form the outer end 51. The slot 52 extends along the axis defined by the longer portion of the first sidewall 50. The slot 52 extends from the outer end 51 inwardly a portion of the distance to the base wall 45. The slot 52 is sized and configured to receive and secure an edge portion 32 of a windshield panel 31 therein as shown in FIG. 3B. The slot 52 of the embodiment shown in FIG. 4 is approximately one and one-fourth (1¼) inches long in the longitudinal direction and three-eighths (⅜) inches wide in the lateral direction. In the embodiment of FIG. 4, the slot 52 ends in a face portion 49 of the first sidewall 50 at the end of the slot 52 distal from the outer end 51. The face portion 49 is disposed between the legs 53, 54.

The holding device 10 further comprises an opposite sidewall 55 which extends from the base wall 45 so as to laterally oppose the first sidewall 50. A post receiving chamber 57 is defined between the first sidewall 50 and the opposite sidewall 55 in the portion of the base wall 45 disposed between the first sidewall 50 and the opposite sidewall 55.

This embodiment of the holding device 10 according to the present invention also comprises an extension 59 which extends laterally beyond the opposite sidewall 55. This extension 59 is provided in order to facilitate manual flexing of the opposite sidewall 55 away from the first sidewall 50 in receiving a post 21 for releasably attaching the windshield assembly 15 to the post 21. This embodiment of the holding device 10 with this extension 59 is illustrated in FIGS. 3A–3C and 4. The extension is preferably integrally formed as a part of the holding device 10 as illustrated in the embodiment of FIG. 4.

The holding device is constructed of a material which allows for flexibility and bending sufficient to enable the holding device 10 to grasp and release the upright posts 21 of the frame 17. The holding device 10 is preferably constructed of an elastomeric material including polymers and co-polymers; co-polymers includes materials having multiple monomers. Exemplary elastomeric materials include styrene-butadiene copolymer, polychloroprene (neoprene), nitrile rubber, butyl rubber, cis-1-4-polyisoprene, ethylene-propylene terpolymer (EPDM rubber), silicone rubber, polyurethane rubber, vinyl and like materials. More preferably the holding device is formed of an elastomeric material including neoprene rubber, ethylene-propylene terpolymer (EPDM rubber), vinyl or the like. Referring more specifically to FIGS. 3A–3C and 4, the holding device 10, in this embodiment, comprises a base wall 45, first side wall 50 and opposite side wall 55 integrally formed of an elastomeric material as described above. While the holding device 10 is preferably integrally formed, the holding device 10 can also be provided as a non-integrally formed, non-unitary body performing in a similar fashion. The holding device 10 in another embodiment comprises at least one of the base wall 45 and opposite side wall 55 formed of an elastomeric material with another part of the holding device 10, such as the first side wall 55, formed of a non-elastic material such as PVC. The holding device 10 is preferably extruded using conventional extruding techniques.

The holding device 10 can also preferably be provided with an ultraviolet inhibitor in the material to protect the holding device 10 from damage caused by exposure to sunlight.

In releasably securing the windshield panel to the vehicle frame, multiple holding devices 10 are preferably used and will be discussed with reference to one holding device when appropriate. The holding device 10 is adapted to be secured along the side edge 32, 33 of a windshield panel 31 so as to permit the windshield panel 31 to be releasably attached to an upright post 21 of the vehicle frame by the holding device 10. In the preferred embodiment as illustrated in FIG. 2, a pair of holding devices 10 are secured along respective opposite side edges 32, 33 of the upper panel 31. Further in this preferred embodiment, the upper panel 31 of the multi-paneled windshield is secured in the slot 52 of the holding device 10.

The slot 52 conforms generally to the shape of the upper panel 31 to retain the edge portions of the upper panel 31 in substantial contact with the legs 53, 54 of the slot 52 as illustrated in FIG. 5A. The holding device 10 in the present embodiment could likewise receive and secure an edge portion of a windshield panel of other configurations such as single or composite windshield panels, or even, differently shaped windshield edges such as ones having beveled or pointed edges. The slot 52 can be formed in various shapes or configurations which coextensively engage the edge portions of the particular windshield panel inserted within the slot 52.

Figure 3C:
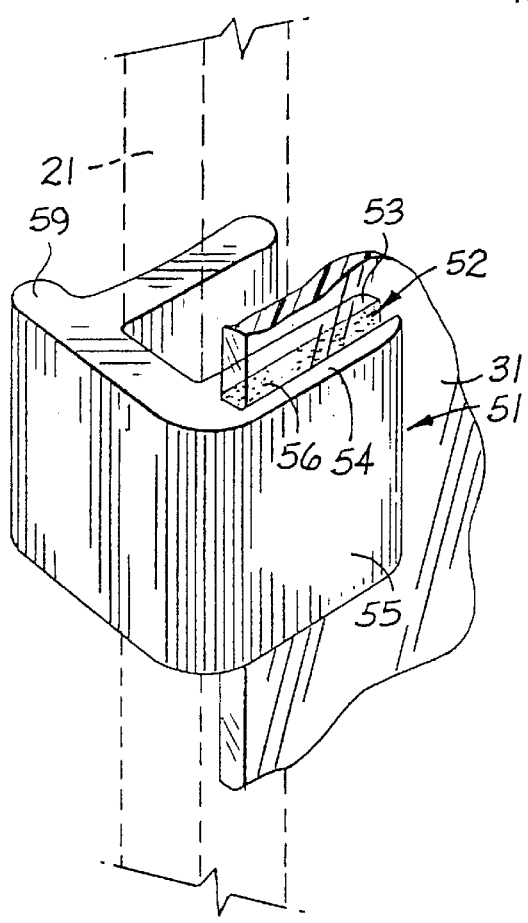

The windshield panel 31 is fixed within the slot 52 of the holding device by an adhesive or other bonding means such as tape or fasteners. Referring to FIGS. 3A–3C, the windshield panel 31 is affixed in the slot 52 of the holding device in this embodiment with a bonding means comprising an adhesive 56. Adhesive 56 is applied within the slot 52 of the first sidewall 55 for bonding the edges 32, 33 of the windshield panel within the slot 52 as shown in FIG. 3A. Preferably bonding means such as cyanoacrylate adhesive and Tetrahydrofuran 6 MEK are utilized to secure the upper panel 35 within the slot 52 of the holding device 10. Such bonding means allows the panel 31 to remain securely attached within the holding device 10 during use in both the raised and lowered positions.

The holding device 10 also provides a high degree of frictional contact with the windshield panel 31 to facilitate securing the panel 31 within the slot 52. FIGS. 5A–5D show the holding device 10 with the side edge 32 of a windshield panel 31 inserted in the slot 52 of the holding device 10 and held within the slot 52. This holding device 10 can be sized to accommodate various widths of windshields. The windshield panel contemplated for use with this embodiment shown in FIG. 4 has a thickness of three-eighths (3/8) of an inch along the side edges 32, 33. Windshield panels 31 are typically provided with widths of one-quarter (1/4) to three-eighths (3/8) inches along the side edges 32, 33.

With the windshield panel 31 firmly secured within the holding device 10, the holding device 10 according to the present invention reduces vibrational forces and shear stress on the windshield panel as no bolts or other fasteners are put through the plane of the windshield panel 31 as shown in FIGS. 3C and 5C. Prior uses had screwed or drilled holes in the panel which led to extensive problems with damaged, cracked and torn windshields which needed to be replaced. The current windshield assembly 15 using no bolts is thus a significant advance over the prior art.

The holding device 10 is provided formed of a material having sufficient flexibility so as to permit the opposite sidewall 55 to be flexed laterally away from the first sidewall 50 and permit the upright support post 21 to be inserted into and removed from the post receiving chamber 57 in a generally lateral direction for releasably grasping the support post 21 as shown in FIGS. 5A–5D. In the preferred embodiment, the extension 59 is grasped to manually flex the holding device 10, opening the post receiving chamber 57, as illustrated in FIG. 5B. When the extension 59 is grasped and pressure is applied in the longitudinal direction normal to the base wall 45, the body member 11 flexes to open the post receiving chamber 57 to a width sufficient to enable the post 21 to be inserted in the chamber 57 in a lateral direction. The embodiment of the holding device 10 shown in FIGS. 5A–5D is constructed of a material such that the opposite sidewall 55 and the base wall 45 can both flexed. Other embodiments could allow only the opposite side wall 55 or base wall 45 to flex in opening the post receiving chamber 57.

Once the post receiving chamber 57 is opened to a size sufficiently large to insert the post 21, the post 21 is inserted in a lateral direction as shown in FIGS. 5C and 5B. In the preferred embodiment, the vehicle front has two opposite upright support posts 21, each of which is inserted into respective post receiving chambers 57 of the pair of holding devices 50 illustrated in FIG. 1.

Once an upright post 21 is inserted within the post receiving chamber 57, the extension 59 is released and the holding device 10 retracts toward its original shape, securing by tension and friction the post 21 within the receiving chamber 67 as shown in FIG. 5D. Upon release of the extension 59, the base wall 45 and opposite sidewall 55 return toward their unflexed positions under sufficient tension to hold the upright support post 21 within the post receiving chamber 57.

To facilitate the holding device 10 releasably grasping the support post 21, the opposite sidewall 55 extends at an angle 61 formed by the base wall 45 and opposite sidewall 55 as shown in the embodiment of FIG. 4. In this embodiment, the angle 61 is preferably less than 90 degrees, and more specifically, approximately 70 to 75 degrees. Having the opposite side wall 55 extend at this angle 61, provides tension in the opposite side wall 55 and base wall 45 when the holding device 10 is flexed to a position further opening the post receiving chamber 57 wherein this angle 61 is greater than the angle 61 prior to flexing as referred to in FIGS. 5A–5D.

With the opposite side wall 55 having been sufficiently flexed, tension is created which, upon releasing the opposite sidewall 55, causes the opposite side wall 55 to return toward the original angle 61, thereby grasping under tension the upright support post 21 in the post receiving chamber 57 at angle 61b. In this preferred embodiment, the opposite sidewall 55 will not return totally to its unflexed position once the post 21 is received within the post receiving chamber 57 due to the post size as illustrated in FIG. 5A and 5D. This facilitates grasping of the frame post 21 as the holding device 10 remains in tension.

The opposite side wall 55 can be disposed at any angle 61 from the base wall 45 which provides sufficient tension in the opposite side wall 55 upon flexing so that upon releasing sufficient tension is provided in the opposite side wall 55 to grasp the upright support post 21. Thus, the holding device 10 according to the present invention can accommodate various sizes of vehicle support posts and frames. The holding device 10 as shown in the embodiment of FIG. 4 has a post receiving chamber 57 defined by an opening of about one inch along the base wall 45 between the inner edge 56 of the opposite side wall 55 and leg 53 of the first side wall 50. The holding device 10 illustrated in the embodiment of FIG. 4 is designed for use with recreational vehicles having a one (1) inch upright post, such as a one inch square aluminum post.

A second angle 62 is formed between the base wall 45 and first side wall 50 also facilitating the releasably grasping of the vehicle frame 17 by the holding device 10. This angle 62 can be provided at different angles so long as it facilitates releasably grasping the vehicle frame 17 by the holding device 10. In the embodiment of the holding device 10 illustrated in FIGS. 5A–5D, the second angle 62 is preferably 20–40 degrees and more preferably 31 degrees.

FIG. 3C shows a holding device 10 according to the present invention with a cutaway view of an upright support post 21 grasped by the holding device 10 within the post receiving chamber 57. The holding device 10 is constructed of a material, preferably an elastomeric material, which possesses sufficient resiliency and elasticity to absorb shocks and other forces and stresses transferred from or experienced by the upright post 21 or windshield panel 31 during movement of the car 20. The base wall 45 and the first sidewall 50 of the holding device 10 provide cushioning between the upper panel 31 and the upright support posts 21. In the preferred embodiment, the leg 53 of the first sidewall 50 remains disposed at all times between the panel 31 and the upright support post 21 and is of sufficient length to prevent direct contact of the upper panel 31 and the upright support post 21 as shown in FIG. 3C. Further, in the preferred embodiment, the upright support post 21 is grasped within the post receiving chamber 57 cushioned on three sides by the base wall 45, the opposite side wall 55, and the first side wall 59.

The embodiment of the holding device 10 according to the present invention shown in FIG. 4 is designed for use with an upright support post 21. Upright support posts of various configurations including square or round can be releasably attached using this and other embodiments of the holding device according to the present invention. The holding device 10 according to the present invention absorbs and dampens vibrational and impact forces and other stresses which would be communicated to the windshield, thus, overcoming the problem of cracking or breaking as in prior methods of connecting windshield assemblies. In addition to eliminating the problem of cracking and marring the windshield panel 31, the holding device 10 retains the windshield assembly 15 attached to the frame 17 in the raised or closed position.

Figure 6:
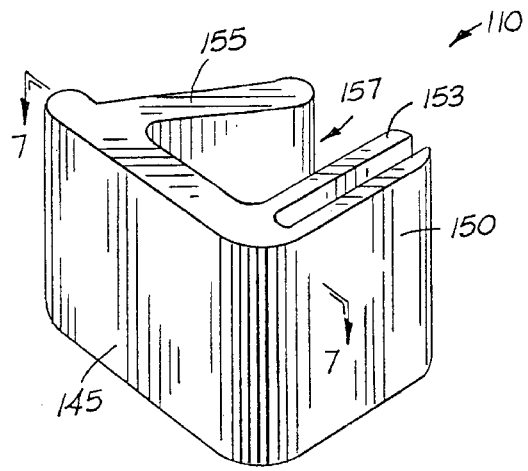
FIG. 6 is a perspective view of an alternative embodiment of the holding device according to the present invention.
Figure 7:
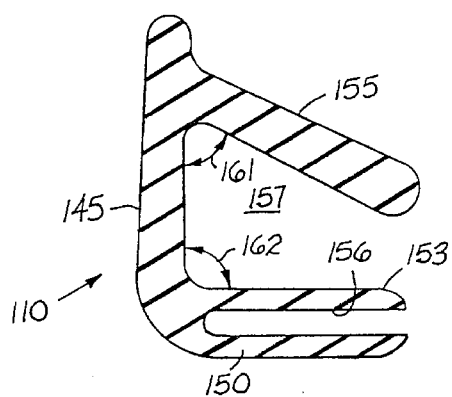
FIG. 7 is a cross-sectional view of this alternative embodiment according to the present invention taken along line 7–7 of FIG. 6.

FIGS. 6 and 7 illustrate another embodiment of the holding device 110 according to the present invention for releasably attaching a windshield panel 31 to an upright support post 21 of a recreational vehicle or golf car 20. The holding device 110 comprises a substantially similar base wall 145, first sidewall 150, and opposite sidewall 155 in terms of composition and function and structure to the holding device 10 of the previous embodiment described. However, the size and dimensions of the base wall 145, first sidewall 150 and opposite sidewall 155 differ from those in the previous embodiment. The alternative embodiment is included to illustrate that the windshield assembly 15 can be effectively releasably attached to various shapes and sizes of vehicle frames and posts using the holding device according to the present invention. The embodiment illustrated in FIGS. 6 and 7 of the holding device 110 according to the present invention is designed for use with recreational vehicles having a ¾ inch steel post such as golf cars sold under the trademark E-Z-GO®. This embodiment of the holding device 110 has a post receiving chamber 157 with an opening of approximately three-fourths (¾) inches along the base wall 145 between the inner edge 156 of the opposite side wall 155 and the leg 153 of the first sidewall 150. The embodiment of the holding device 110 shown in FIG. 6 releasably attaches the windshield panel 31 to an upright support post 21.

As with the prior embodiment, to facilitate the holding device 110 releasably grasping the support post 21, the opposite sidewall 155 extends at an angle 161 formed by the base wall 145 and opposite sidewall 155 as shown in the embodiment of FIG. 7. In this embodiment, the first angle 161 is preferably approximately 55 to 75 degrees and more preferably approximately 60 to 70 degrees. Having the opposite side wall 155 extend at this angle 161, also provides tension in the opposite side wall 155 and base wall 145 when the holding device 110 is flexed to a position further opening the post receiving chamber 157 wherein this first angle is greater than the angle 161 prior to flexing.

Also as in the prior embodiment, the holding device 110 according to the embodiment shown in FIG. 7 is provided with a second angle 162 is formed between the base wall 145 and first side wall 150 also facilitating the releasably grasping of the vehicle frame 17 by the holding device 110. This angle 162 can be provided at different angles so long as it facilitates releasably grasping the vehicle frame 17 by the holding device 10. In the embodiment of the holding device 110 illustrated in FIG. 7, the second angle 162 is preferably 70 to 90 degrees and more preferably approximately 80 to 85 degrees.

The holding device according to the present invention as described in both embodiments is also contemplated in combination with a windshield assembly 15 according to the present invention. One embodiment of the windshield assembly 15 having the holding device 10 according to the present invention as illustrated in FIGS. 1 and 2 comprises a multi-panel windshield 29 comprising an upper panel 31 and a lower panel 35. These windshield panels may be constructed of any suitable material for providing sufficient visibility as well as durability. Such materials are well known and include clear or tinted, methyl methacrylate or acrylic, and high impact acrylic or the like. The windshield assembly 15 is sized to fit substantially between the upright posts of the front of the frame 17.

The upper panel 31 is joined to the lower panel 35 by a joining means illustrated in FIG. 2 as a hinge 65. various hinge or joining means are contemplated or suitable in such windshield assemblies and are known.

This hinge 65 comprises an upper rigid PVC strip 66 and a lower rigid PVC strip 68 which are joined by a flexible PVC strip 69 integrally formed between the upper rigid strip 66 and lower rigid strip 68. The upper rigid strip 66 is connected to the upper panel 31 along the width of the lower outside surface of the upper panel 31. The lower rigid strip 66 likewise is connected to the lower panel 35 along the width of the upper outside surface of the lower panel 35. The rigid strips 66, 68 are respectively fixed to the upper panel 31 and lower panel 35 using an adhesive. Various other means of fixing these rigid strips can be utilized with adhesive being preferred.

The hinge 65 is constructed of a material with sufficient flexibility to allow the upper panel 31 to pivotally rotate relative to the lower panel 35 when the upper panel 31 is moved from the raised position to the lowered position as shown in FIG. 2. Thus, as the upper panel 31 is moved between the raised or closed position and the lowered or open position the flexible strip 69 bends. The rigid strips 66, 68 remain respectively fixed to the upper panel 31 and lower panel 35 during movement of the upper panel 31 between the closed and open positions. The hinge 65 illustrated in FIG. 2 is a co-extruded PVC material. Other suitable joining means can be used with the windshield assembly 15 of the present invention such as other types of hinges and pivotable fasteners, the selection of which is within the ordinary skill of one in the art.

Connecting means for affixing the lower panel 35 of the windshield assembly 15 to the golf car frame 17, are provided in FIG. 1. The embodiment of FIG. 1 shows these connecting means as a plurality of snap-on clips or 71, 72, 73, and 74 formed of polyvinyl chloride ("PVC") or like material. Other connecting means can be used to affix the lower panel 35 to the vehicle frame 11 in such a manner that the lower panel 35 does not move, loosen, rattle or squeak during use. However, these preferred clips allow for attachment of the entire windshield assembly 15.

The windshield assembly 15 in the preferred embodiment is shown in FIG. 1 with polyvinyl chloride clips 71, 72, 73 and 74 snap attached to the vehicle 20 and securing the lower panel 35 of the windshield 29. More specifically, these clips 71, 72, 73, and 74 snap over the vehicle support post 16 in a open channel within each clip. In the illustrated form, two pairs of PVC snap-on clips 71, 72 with 73, 74 snap attach to each of the opposite front upright posts 21. For a recreational vehicle with a unshaped post configuration, an elongated PVC snap-on clip attaches to the horizontal frame post of the unshaped post frame and along the lower horizontal edge 39 of the lower windshield panel 35. The elongated clip is designed with the same structure and configuration of clips 71, 72, 73, and 74. These clips 71, 72, 73, and 74, however, can be disposed on the windshield lower panel 35 in various orders. Varying sizes and numbers of such clips are contemplated depending on the windshield panel size, thickness and composition.

These clips 71, 72, 73, and 74 also contain ribbed slots 77 having slot walls which form an opening for receiving the lower panel 35. The openings of these slots 77 are in a direction approximately normal to the direction of the channel opening of the clips 71, 72, 73, and 74. Each of these ribbed slots 77 has a plurality of ribs extending from the slot walls in a direction approximately normal to the plane of the windshield lower panel 35. These ribbed slots 77, shown in FIG. 2, receive and secure, in frictional contact, the lower panel 35 at its side edges 36, 37 and lower edge 39. The ribbed slots are sized to secure the lower panel 35. These clips 71, 72, 73, and 74 do not require additional tools and can be quickly and easily manually affixed to both the lower panel 35 of the windshield and to the golf car frame 17. These clips 71, 72, 73, and 74 also hold the windshield panel 31 apart from direct contact with the frame 17.

Provided along the lower edge 39 of the lower panel 35 are window retaining clips 79, 81 illustrated in FIG. 1 for receiving the upper panel 35 in the lowered or open position. These windshield retaining clips 79, 81 are attached to the windshield lower panel 35 in ribbed slots 77 of the same configuration as the ribbed slots 77 of clips 71, 72, 73 and 74. These window retaining clips 79, 81 are also PVC snap-on clips which snap attach to the front horizontal frame post 14 of a unshaped post frame of the vehicle 20 in an open channel similar to that of the PVC snap-on lower panel retaining clips 71, 72, 73 and 74. These windshield retaining clips 79, 81 include windshield receiving arms 83, 85 which hold the upper panel 31 in the lowered position. These windshield retaining arms 83, 85 also have ribbed slots 87, shown in FIG. 2, which receive a curved upper edge 28 of the upper panel 35 of the windshield assembly when it is moved to lowered position.

When the upper panel 31 is in the raised position, the holding device 10 is flexed to releasably attach the upright posts 21 thereby holding the upper panel 31 in this raised position as shown in FIG. 1 and described above more fully. When the upper panel 31 is in the lowered position, the holding device 10 is secured to the upper panel 31 in an unflexed position as shown in FIG. 5A. The embodiment of the windshield assembly 15 shown in FIG. 1 includes a curved upper windshield edge 28 which is known in the art. The upper panel 31 contains, in the embodiment of FIG. 1, a curved upper edge 28 which extends in a generally forward direction beyond the plane of the upper panel 31 defined by the side edges 31, 32. This curved upper edge 28 is secured within the ribbed slot 87 of the windshield receiving arms 83, 85 of the respective windshield retaining clips 79, 81 retaining the upper panel 31 in the full lowered position.

In FIG. 1, a wheeled vehicle such as a golf car is illustrated comprising this windshield assembly 15 including the holding device 10 according to the present invention. The wheeled vehicle shown comprises a conventional golf car 20 having a frame 17 as described above more fully. The windshield assembly 15 is also that previously described. As such, in the raised position shown, the upper panel 31 of the windshield assembly 15 is releasably attached to the frame 17 of the vehicle 20. The windshield upper panel 31 can be moved from the raised position to the lowered position simply be releasing the holding device 10 from the upright support posts 21 of the front 22 of the vehicle 20 and pivotally moving the upper panel 31. The windshield assembly using the holding device according to the present invention shown in FIG. 1 can be used with other recreational vehicles having a hinged windshield which would benefit from the windshield assembly with the holding device according to the present invention.

As explained, no tools are necessary for attaching the windshield assembly 15 to the vehicle 20. Thus, the upper panel 31 of the windshield 29 can easily be attached or detached from the vehicle frame 17 to move from the closed to open position during use manually as described in relation to the holding device 10. The windshield assembly 15 is also releasably attached to the vehicle frame 17 as described in terms of the holding device 10 and other connecting means. The windshield assembly, while secured in place for use in either the open or closed position, can be easily removed after use for repairs or replacements by unsnapping the snap-on clips 71, 72, 73 and 74 and windshield retainer clips 79, 81 and releasing the holding devices 10. Thus, the windshield assembly 30 according to the present invention can be manually attached or detached in a matter of minutes by the end user.

Further, no alterations or destruction of the golf car 20 or windshield assembly 15 is needed for the end user to install this windshield assembly 15 on the vehicle from 17 contrary to prior windshield assemblies which required holes to be drilled or screws or fasteners placed in the golf car or windshield. The present windshield assembly 15 with the holding device 10 also eliminates the problem of prior windshield assemblies which fell off or slipped during use.

That which is claimed:

1. A holding device adapted to be secured along a side edge of a windshield panel so as to permit the windshield panel to be releasably secured to a post, said holding device being integrally formed of an elastomeric material and being of a generally U-shaped configuration, said holding device comprising:

a base wall which defines a lateral direction, a first side wall extending outwardly from said base wall, said first side wall defining an outer end and having a slot formed therein which extends from said outer end inwardly a substantial portion of the distance to said base wall, with said slot being sized and configured to receive an edge portion of a windshield panel therein, an opposite side wall extending outwardly from said base wall so as to laterally oppose said first side wall and define a post receiving chamber therebetween, said holding device formed of a material having sufficient flexibility so as to permit the opposite side wall to be flexed laterally away from said first side wall from a first unflexed position to a second flexed position and thereby permit a post to enter and be removed from said chamber in a generally lateral direction, said opposite side wall being disposed at an acute angle to said base wall such that said post receiving chamber is tapered so that when said opposite side wall is in its unflexed position, an open end defined by said first side wall and said opposite side wall outer ends is smaller than a maximum width inner position defined by said opposite side wall and said first side wall.

2. The holding device as defined in claim 1 wherein said holding device is constructed of ethylene-propylene terpolymer (EPDM rubber).

3. The holding device as defined in claim 1 wherein said holding device includes an ultraviolet inhibitor to protect the holding device from damage from exposure to sunlight.

4. A holding device adapted to be secured along a side edge of a windshield panel so as to permit the windshield panel to be releasably secured to a post, said holding device being integrally formed of an elastomeric material and being of a generally U-shaped configuration, said holding device comprising:

a base wall which defines a lateral direction, a first side wall extending outwardly from said base wall, said first side wall defining an outer end and having a slot formed therein which extends from said outer end inwardly a substantial portion of the distance to said base wall, with said slot being sized and configured to receive an edge portion of a windshield panel therein, an opposite side wall extending outwardly from said base wall so as to laterally oppose said first side wall and define a post receiving chamber therebetween, said holding device formed of a material having sufficient flexibility so as to permit the opposite side wall to be flexed laterally away from said first side wall from a first unflexed position to a second flexed position and thereby permit a post to enter and be removed from said chamber in a generally lateral direction, said post receiving chamber being tapered such that when said opposite side wall is in its unflexed position, an open end defined by said first side wall and said opposite side wall outer ends is smaller than a maximum width inner position defined by said opposite side wall and said first side wall, wherein said base wall includes an extension which extends laterally beyond said opposite side wall so as to facilitate manual flexing of said opposite side wall away from said first side wall.

5. The holding device as defined in claim 4 wherein said holding device is constructed of ethylene-propylene terpolymer (EPDM rubber).

6. The holding device as defined in claim 4 wherein said holding device includes an ultraviolet inhibitor to protect the holding device from damage from exposure to sunlight.

7. A holding device adapted to be secured along a side edge of a windshield panel so as to permit the windshield panel to be releasably secured to a post, said holding device being integrally formed of an elastomeric material and being of a generally U-shaped configuration, said holding device comprising:

a base wall which defines a lateral direction, a first side wall extending outwardly from said base wall, said first side wall defining an outer end and having a slot formed therein which extends from said outer end inwardly a substantial portion of the distance to said base wall, with said slot being sized and configured to receive an edge portion of a windshield panel therein, an opposite side wall extending outwardly from said base wall so as to laterally oppose said first side wall and define a post receiving chamber therebetween, said opposite side wall being disposed at an acute angle to said base wall such that said post receiving chamber is tapered so that when said opposite side wall is in its unflexed position, an open end defined by said first side wall and said opposite side wall outer ends is smaller than a maximum width inner position defined by said opposite side wall and said first side wall;

said holding device formed of a material having sufficient flexibility so as to permit the base wall to be flexed away from said first side wall from a first unflexed position to a second flexed position and thereby permit said opposite side wall to move laterally away from said first side wall to widen the open end of said post receiving chamber so as to enable a post to enter and be removed from said chamber in a generally lateral direction.

8. The holding device as defined in claim 7 wherein said holding device is constructed of ethylene-propylene terpolymer (EPDM rubber).

9. The holding device as defined in claim 7 wherein said holding device includes an ultraviolet inhibitor to protect the holding device from damage from exposure to sunlight.

* * * * *